May 20, 1941.   N. A. ALGREN ET AL   2,242,281
REFRIGERATION
Filed April 19, 1940   2 Sheets-Sheet 2

INVENTORS
Nils Albert Algren
Bengt Rehstad
J. E. Heath
their ATTORNEY.

Patented May 20, 1941

2,242,281

UNITED STATES PATENT OFFICE 2,242,281

REFRIGERATION

Nils Albert Algren and Bengt Reistad, Stockholm, Sweden, assignors, by mesne assignments, to Servel, Inc., New York, N. Y., a corporation of Delaware Application April 19, 1940, Serial No. 330,450
In Germany May 30, 1939

14 Claims. (Cl. 62—119.5)

Our invention relates to refrigeration systems in which refrigerant fluid evaporates in the presence of auxiliary inert gas and more particularly to a gas heat exchanger for use in a system of this type.

The refrigerant fluid evaporates in the presence of inert gas in an evaporator and accompanies the gas to an absorber. Refrigerant fluid is absorbed out of the gas in the absorber and the gas returns to the evaporator. Gas flowing to and from the evaporator is brought in thermal exchange for conservation of heat. We provide in a horizontal type gas heat exchanger one or more pools of liquid in a corresponding number of openings connecting the paths of flow of gas to and from the evaporator, the liquid in each pool controlling an opening with respect to passage of gas therethrough during operation of the system while permitting flow of liquid from one gas path to the other.

Figure 1:
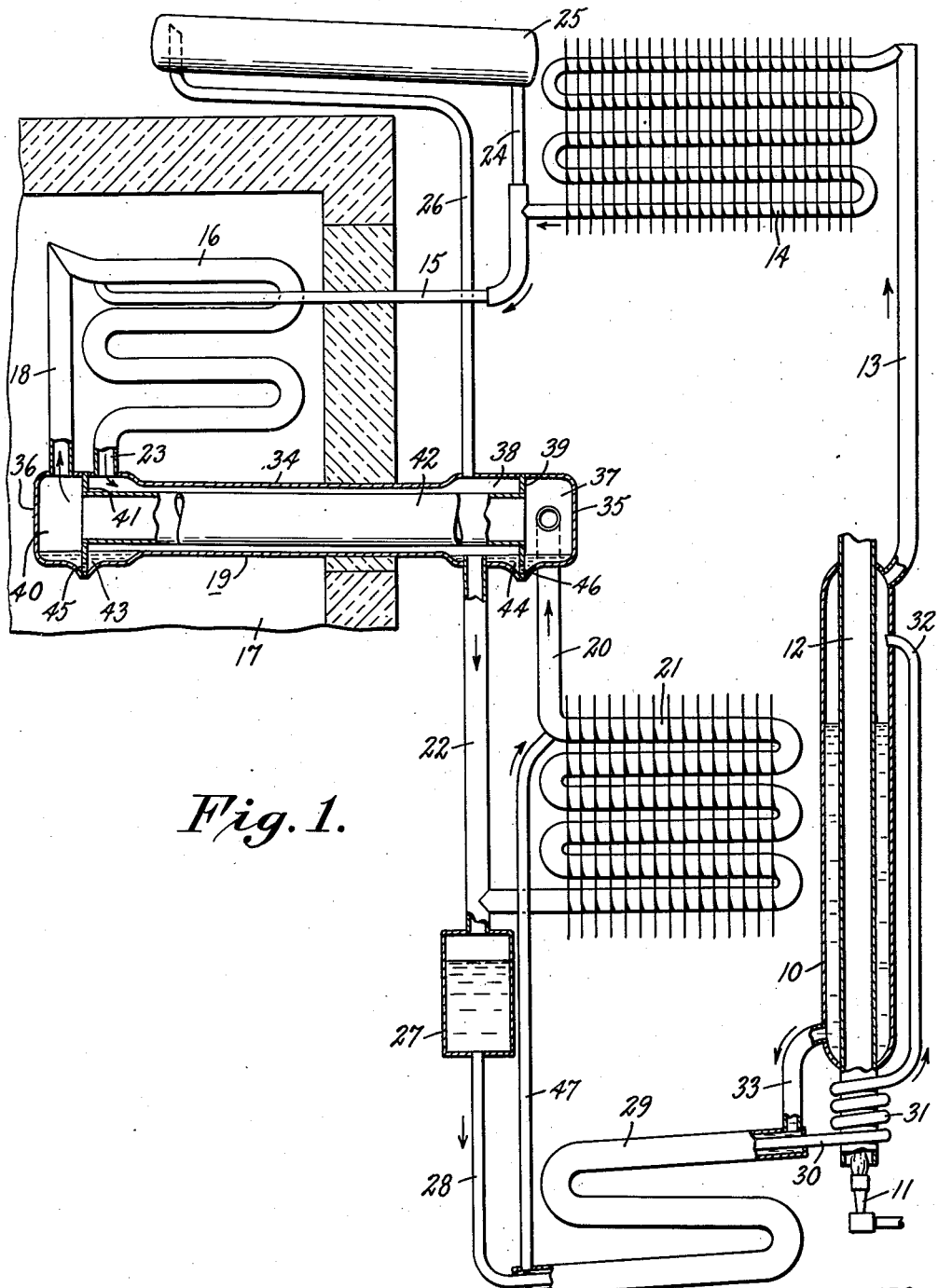
Figure 2:
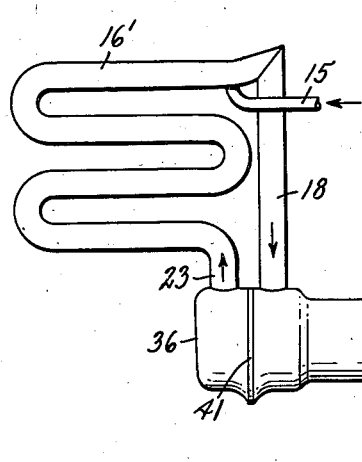
Figure 2:
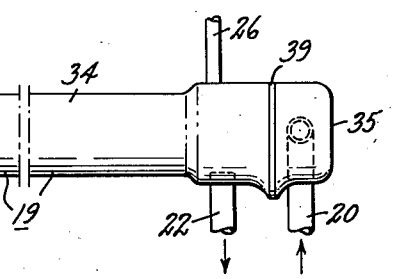
Figure 3:
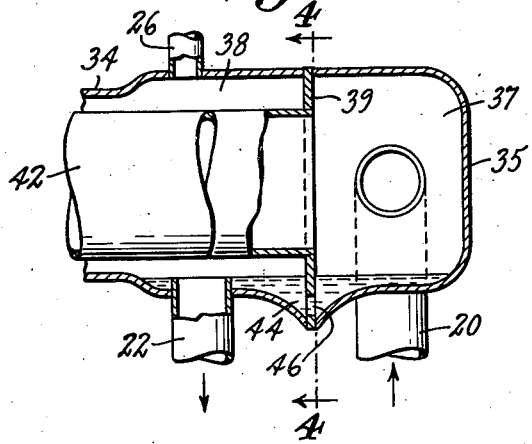
Figure 4:
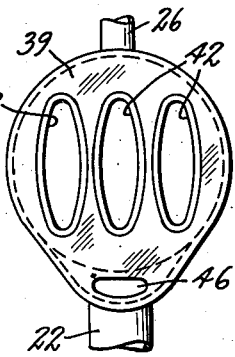

Fig. 1 shows more or less diagrammatically a refrigeration system provided with a gas heat exchanger embodying the invention; Fig. 2 shows a system like that in Fig. 1 but arranged for reverse flow of gas through the evaporator; Fig. 3 is a detail sectional view of a part of the gas heat exchanger shown in Figs. 1 and 2; and Fig. 4 is a detail sectional view on line 4—4 in Fig. 3.

Referring to Fig. 1, a generator 10 is heated by a gas burner 11 arranged so that the burner flame projects upward into a flue 12 which extends upward through the generator. The upper part of generator 10 is connected by a conduit 13 to an air cooled condenser 14. The lower part of the condenser 14 is connected by a conduit 15 to the upper part of an evaporator 16 located in a refrigerator compartment 17.

The upper end of evaporator 16 is connected by a conduit 18, the inner passage of a gas heat exchanger 19, and a conduit 20 to the upper end of an air cooled absorber 21. The lower end of absorber 21 is connected by a conduit 22, the outer passage of gas heat exchanger 19, and conduit 23 to the lower end of evaporator 16. The lower end of condenser 14 is connected by a conduit 24, a vessel 25, and conduit 26 to the outer passage of gas heat exchanger 19.

The lower end of absorber 21 is also connected by conduit 22, absorber vessel 27, conduit 28, the inner passage of liquid heat exchanger 29, and a conduit 30 to the lower end of a pipe coil 31 which is arranged around the lower end of generator flue 12. The upper end of coil 31 is connected by conduit 32 to the upper part of generator 10. The lower part of generator 10 is connected by a conduit 33, the outer passage of liquid heat exchanger 29, and conduit 47 to the upper part of absorber 21.

The above described system is hermetically sealed and contains a solution of refrigerant fluid in an absorbent such as a water solution of ammonia, and an auxiliary inert gas such as hydrogen. In operation, pipe coil 31 and generator 10 are heated by burner 11. This heating causes expulsion of ammonia vapor from solution both in coil 31 and generator 10. Vapor expelled in coil 31 rises through this coil and through conduit 32 causing upward flow of liquid through conduit 32 into the generator 10 by vapor lift action, as known. Vapor expelled in generator 10 together with vapor from vapor lift conduit 32 flows through conduit 13 to condenser 14. Ammonia vapor condenses to liquid in condenser 14. The liquid flows through conduit 15 into the upper end of evaporator 16.

Liquid ammonia flows downward in evaporator 16 and evaporates and diffuses into hydrogen, producing a refrigerating effect for cooling refrigerator compartment 17. The resulting mixture of ammonia vapor and hydrogen, referred to as rich gas, flows downward through conduit 23, gas heat exchanger 19, and conduit 22 to the absorber 21. Ammonia vapor is dissolved out of rich gas in the absorber 21 by absorption liquid. The resulting gas, referred to as weak or poor gas flows from the upper end of absorber 21 through conduit 20, gas heat exchanger 19, and conduit 18 back to the evaporator 16.

Weakened solution flows by gravity from generator 10 through conduit 33, liquid heat exchanger 29, and conduit 47 into the upper end of absorber 21. The weakened solution flows downward through absorber 21, absorbing the ammonia vapor as described. The resulting enriched solution flows from the lower end of absorber 21 through conduit 22 into absorber vessel 27 and thence through conduit 28, liquid heat exchanger 29, and conduit 30 to the lower end of coil 31. The liquid is raised through vapor lift conduits 31 and 32 into the generator as previously described.

Gas which is mostly hydrogen is stored in vessel 25. Upon increase in room temperature, uncondensed ammonia vapor from condenser 14 flows through conduit 24 into vessel 25 and displaces hydrogen from this vessel through conduit 26 into the absorber-evaporator circuit until the total pressure in the system is increased to correspond to the higher condensing temperature of the ammonia vapor.

Weak gas flowing from absorber 21 through conduit 20 contains water vapor at a partial pressure substantially equal to that of the vapor pressure of water in the solution in the absorber at absorber temperature. In passing through gas heat exchanger 19, the weak gas is cooled by heat transfer to cooler strong gas flowing from the evaporator toward the absorber. This decrease in temperature causes condensation of water in the weak gas line. It is known to drain this condensate from the weak gas line into the strong gas line. We effect this by providing in gas heat exchanger 19 a pit or well which is open to both lines and which permits flow of liquid from one line to the other, the liquid, however, cutting off gas flow through the pit between the lines.

Referring to Figs. 1, 3 and 4, gas heat exchanger 19 is formed by a center cylinder 34 provided with end caps 35 and 36. Within end cap 35 is an end chamber 37 which is separated from chamber 38 inside of cylinder 34 by a partition wall 39. Within end cap 36 there is an end chamber 40 which is similarly separated from chamber 38 by a partition wall 41. Within chamber 38 are a plurality of tubes 42. These tubes connect end chambers 37 and 40 through tube openings in partition walls 39 and 41. What was referred to above as the inner passage of gas heat exchanger 19 comprises the end chambers 37 and 40 together with the connecting tubes 42. Chamber 38 forms what has been referred to as the outer passage of gas heat exchanger 19. The end caps 35 and 36 and also the ends of cylinder 34 are substantially circular except at the bottom where the edges are dished outward and downward. The dished portions of end cap 36 and corresponding end of cylinder 34 form a pit or well 43. The lower dished edges of end cap 35 and corresponding end of cylinder 34 together form a pit or well 44. The partition wall 41 is formed with a lower lip which divides the pit or well 43. Partition wall 39 is similarly formed, as shown in Figs. 3 and 4, to divide well 44. The lower lip of partition wall 41 is provided with a slot 45. The lower lip of partition wall 39 is provided with a similar slot 46.

Conduit 22 which connects the lower end of absorber 21 with the heat exchanger has its upper end connected to the bottom of cylindrical shell 34. The upper end of conduit 22 is open and juts upward within chamber 38 adjacent the pit or well 44. The upper end of conduit 22 is open at a distance below the bottoms of conduits 42. Liquid which enters gas heat exchanger 19 cannot accumulate above the level of the upper open end of conduit 22. This level is above the upper edges of slots 45 and 46 so that when liquid is in the wells 43 and 44, the slots 45 and 46 are covered and sealed by liquid against flow of gas therethrough. Thus liquid can pass back and forth through slots 45 and 46, but gas cannot flow therethrough when the pits or wells contain liquid.

When operation of the system shown in Fig. 1 is started while there is no liquid in wells 43 and 44, gas circulation will not start because the short circuiting slots 45 and 46 are not sealed by liquid. Sealing liquid is at first supplied by liquid ammonia which flows downward through evaporator 16 through conduit 23 into the gas heat exchanger. This liquid first enters well 43 and seals slot 45 and then flows through chamber 38 into well 44 and seals slot 46. The short circuiting of the gas circuit being removed, gas circulation takes place in the direction indicated by the arrows due to difference in specific weights of the weak and rich gas.

The system shown in Fig. 2 is identical with that shown in Fig. 1 except that gas flow is upward through evaporator 16'. In order that gas circulation will start in the direction indicated by the arrows, conduit 22 is made longer than the length of conduit 23 plus the height of evaporator 16'. When overflow liquid from the evaporator flows into gas heat exchanger 19 and thence overflows into the upper end of conduit 22, evaporation of ammonia and diffusion of the vapor into gas in conduit 22 creates a column of gas that is higher and therefore weightier than the column of gas in evaporator 16' and conduit 23 so that circulation starts in the direction in which gravity affects the column in conduit 22, that is downward.

In both the arrangements in Figs. 1 and 2, the heat exchanger 19 slopes slightly to the right so that water which condenses out of weak gas in the inner passage of the gas heat exchanger flows into the well 44 by way of the end chamber 40. The water gradually displaces liquid ammonia, and the water drains through the pit by way of slot 46 from the weak gas line into the strong gas line.

Liquid ammonia in well 43 becomes depleted by evaporation and diffusion into gas in the heat exchanger. When it is not replaced, slot 45 becomes unsealed, causing a short circuit in the inert gas circuit. This slows down gas circulation as explained, for instance, in Patent No. 2,136,600 to Hugo M. Ullstrand. If the load on the evaporator, that is, the refrigeration demand, is greater than that which can be accommodated by the reduced circulation rate, unevaporated liquid flows from the evaporator into well 43 to seal the slot 45. If the evaporator load is light, the gas circulation continues at its reduced rate until the load increases and calls for increase in supply of liquid ammonia to the evaporator. This structure therefore also provides control of gas circulation responsive to an operating condition of the system.

Various changes and modifications may be made within the scope of the invention as set forth in the following claims.

What is claimed is:

1. In a refrigeration system including an evaporator and an absorber and containing auxiliary gas, a heat exchanger which conducts in heat exchange relation substantially horizontal streams of gas flowing in opposite directions between said evaporator and absorber and having a liquid holding pit common to said gas streams, an overflow for liquid from said pit, and a partition projecting downward into said pit below the level of said overflow and formed to permit movement of liquid in said pit from one side to the other of said partition while obstructing flow of gas therethrough when liquis is contained in said pit.

2. A horizontal gas heat exchanger as set forth in claim 1 in which said pit is arranged to receive liquid flowing from said evaporator.

3. A horizontal gas heat exchanger as set forth in claim 1 arranged so that condensate therein drains into said pit.

4. In refrigeration apparatus containing auxiliary gas, a horizontal gas heat exchanger comprising an external casing and internal wall structure forming end chambers connected by gas passages and a chamber surrounding said gas passages, said exterior casing being dished at the bottom to form a pit common to said center chamber and one of said end chambers, said internal wall structure including a partition plate between said center chamber and said end chamber and projecting downward into said pit, said partition being formed to permit movement of liquid in said pit from one side to the other of said partition while obstructing flow of gas therethrough when liquid is contained in said pit.

5. A gas heat exchanger as set forth in claim 4 in which said external casing is substantially cylindrical, and said partition is circular except at the bottom where it is formed with a lip conforming to the vertical cross section of said pit, said lip having an opening located below the upper edge of said pit.

6. In refrigeration apparatus including an evaporator and an absorber and containing auxiliary gas, a horizontal gas heat exchanger which conducts in heat exchange relation streams of gas flowing in opposite directions between said evaporator and absorber, two liquid holding wells each of which is common to said gas streams and permits movement of liquid from one stream to the other while obstructing the flow of gas from one stream to the other when the liquid is contained therein, both of said wells being arranged to receive liquid flowing from said evaporator, and one of said wells also being arranged to receive by drainage condensate from a gas stream.

7. A horizontal gas heat exchanger as set forth in claim 6 in which said condensate receiving well receives liquid from said evaporator by overflow from said other well.

8. In refrigeration apparatus including an evaporator and an absorber and containing auxiliary gas, a horizontal gas heat exchanger comprising an external casing and internal wall structure forming end chambers connected by gas passages and a chamber surrounding said gas passages, said exterior casing being dished at the bottom to form two pits each common to said center chamber and one of said end chambers, said internal wall structure including a partition plate between said center chamber and each of said end chambers and projecting downward into one of said pits, each partition being formed to permit movement of liquid in said pit from one side to the other of said partition while obstructing flow of gas therethrough when liquid is contained in said pit.

9. Apparatus as set forth in claim 8 in which said heat exchanger is sloped so that the pit at the lower end receives condensate by gravity drainage and also liquid by overflow from the pit at the higher end, the lower end of said gas heat exchanger being connected to said absorber, and the higher end being connected to said evaporator so that liquid flowing from said evaporator first enters the pit at the higher end.

10. In an absorption refrigeration system having an evaporator, an absorber, and a substantially horizontal gas heat exchanger connected to provide a circuit for circulation of gas, structure associated with the lower part of said horizontal gas heat exchanger formed and arranged to provide separated spaces serving as different parts of the gas circuit and also to provide a liquid drain from one space to the other space in which liquid accumulates to form a liquid seal between the spaces.

11. In an absorption refrigeration system having a circuit for an inert gas including an evaporator, absorber, and a substantial horizontally inclined gas heat exchanger, said gas heat exchanger including a shell having end plates to provide end spaces and tubes connecting said end spaces and terminating at said end plates, said end spaces and tubes forming one passage for gas in said gas heat exchanger and the space between said end plates and surrounding said tubes forming another passage in said heat exchanger, structure associated with the lower part of said gas heat exchanger formed and arranged to provide separated spaces, one of which is in communication with an end space and the other of which is in communication with the space between said end plates, and a liquid drain from one space to the other space in which liquid accumulates to provide a seal between the spaces.

12. In an absorption refrigeration system having a circuit for an inert gas including an evaporator, an absorber, and a substantially horizontally inclined gas heat exchanger, structure associated with the lower part of said gas heat exchanger, said structure being formed and arranged to collect liquid from weak gas flowing from the absorber to the evaporator and remove such liquid to rich gas flowing from the evaporator to the absorber, such liquid being removed from the weak gas to the rich gas through a liquid seal.

13. In an absorption refrigeration system having an evaporator, absorber, and a substantially horizontally inclined gas heat exchanger connected to provide a circuit for circulation of gas, said gas heat exchanger having a passage in which gas weak in refrigerant flows from the absorber to the evaporator and another passage in which gas rich in refrigerant flows from the evaporator to the absorber, structure associated with the lower part of said gas heat exchanger providing a first space in communication with said weak gas passage and a second space in communication with said rich gas passage, said structure associated with the lower part of said heat exchanger being formed and arranged so that said spaces are in communication with each other to permit liquid to flow from said first space to said second space with such liquid forming a liquid seal between said spaces.

14. A refrigeration system as set forth in claim 13 including means whereby liquid accumulating to form the liquid seal flows in said circuit toward the absorber along with gas rich in refrigerant.

NILS ALBERT ALGREN.
BENGT REISTAD.